(12) United States Patent
Kersting et al.

(10) Patent No.: US 9,193,617 B2
(45) Date of Patent: Nov. 24, 2015

(54) REFRACTORY LINER STRUCTURE AND USE IN GLASS FUSION DRAW

(71) Applicant: Corning Incorporated, Corning, NY (US)

(72) Inventors: John Jerry Kersting, Painted Post, NY (US); Steven Michael Milillo, State College, PA (US); Jon Anthony Passmore, Painted Post, NY (US); Andrew Voss Welles, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/414,509

(22) PCT Filed: Jul. 26, 2013

(86) PCT No.: PCT/US2013/052214
§ 371 (c)(1),
(2) Date: Jan. 13, 2015

(87) PCT Pub. No.: WO2014/018838
PCT Pub. Date: Jan. 30, 2014

(65) Prior Publication Data
US 2015/0166388 A1    Jun. 18, 2015

Related U.S. Application Data

(60) Provisional application No. 61/676,028, filed on Jul. 26, 2012.

(51) Int. Cl.
*C03B 17/06* (2006.01)

(52) U.S. Cl.
CPC .................................. *C03B 17/064* (2013.01)

(58) Field of Classification Search
CPC ....................................................... C03B 17/064
See application file for complete search history.

(56) References Cited

U.S. PATENT DOCUMENTS

| 1,859,799 | A | * | 5/1932 | Rix ............................ 312/140 |
| 2,366,532 | A | | 1/1945 | Jones et al. |
| 2,776,521 | A | | 1/1957 | Zimmerman |
| 3,005,282 | A | | 10/1961 | Christiansen |
| 3,800,494 | A | | 4/1974 | Hall et al. |

(Continued)

FOREIGN PATENT DOCUMENTS

| EP | 1695785 | 8/2006 |
| WO | 2009/151547 | 12/2009 |

OTHER PUBLICATIONS

WO2013052214—Search Report.

*Primary Examiner* — Joshua J Michener
*Assistant Examiner* — Keith Minter
(74) *Attorney, Agent, or Firm* — John L. Haack

(57) ABSTRACT

An interlocking structure including: a top panel; a first wall and second wall; a first brace and a second brace each having interlocks that interlock with complementary interlocks on the top panel and at least one of the first and second walls. The structure can optionally have an additional interlocking joint, for example, a boss and via, between the top panel and contact point(s) or contact regions of each wall, and the interlocking joint can optionally have an adhesive seal to lock the optional interlocking joints. Also disclosed is a method of making the liner article and methods for using the article for forming glass, as defined herein.

15 Claims, 3 Drawing Sheets

(56) References Cited

U.S. PATENT DOCUMENTS

| | | | | |
|---|---|---|---|---|
| 3,901,572 | A | * | 8/1975 | Litchfield .................. 312/348.2 |
| 4,099,815 | A | | 7/1978 | Cox et al. |
| 4,214,886 | A | | 7/1980 | Shay et al. |
| 4,303,289 | A | * | 12/1981 | Hardy ........................ 312/348.2 |
| 4,379,604 | A | * | 4/1983 | Rock et al. ................. 312/348.1 |
| 4,403,817 | A | * | 9/1983 | Aidar ......................... 312/265.1 |
| 4,676,762 | A | | 6/1987 | Ballard |
| 5,259,687 | A | * | 11/1993 | John ............................. 403/295 |
| 5,944,439 | A | * | 8/1999 | Ellsworth et al. ............. 403/231 |
| D421,133 | S | * | 2/2000 | Mandell ......................... D25/61 |
| 6,050,661 | A | * | 4/2000 | Fleisch ....................... 312/348.1 |
| 8,006,517 | B2 | | 8/2011 | Pitbladdo |
| 8,007,913 | B2 | | 8/2011 | Coppola et al. |
| 2004/0101357 | A1 | * | 5/2004 | Dijkstra et al. ............... 403/403 |
| 2004/0187400 | A1 | * | 9/2004 | Anderson et al. .............. 52/79.1 |
| 2010/0293868 | A1 | * | 11/2010 | Holzworth ..................... 52/79.5 |
| 2011/0126587 | A1 | | 6/2011 | Berkey et al. |
| 2011/0277504 | A1 | * | 11/2011 | Pitbladdo ........................ 65/53 |
| 2012/0000142 | A1 | * | 1/2012 | McKimmy et al. ............ 52/79.1 |
| 2012/0110926 | A1 | * | 5/2012 | Phillips et al. ................ 52/79.9 |
| 2014/0238077 | A1 | * | 8/2014 | Anderson et al. ............ 65/29.11 |

* cited by examiner

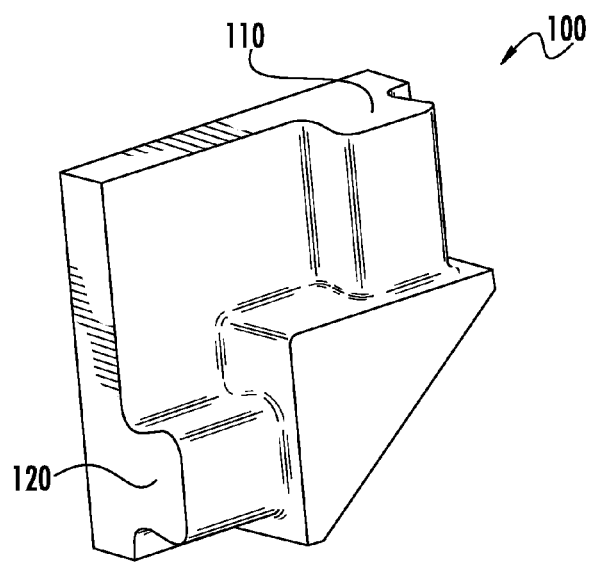
FIG. 1
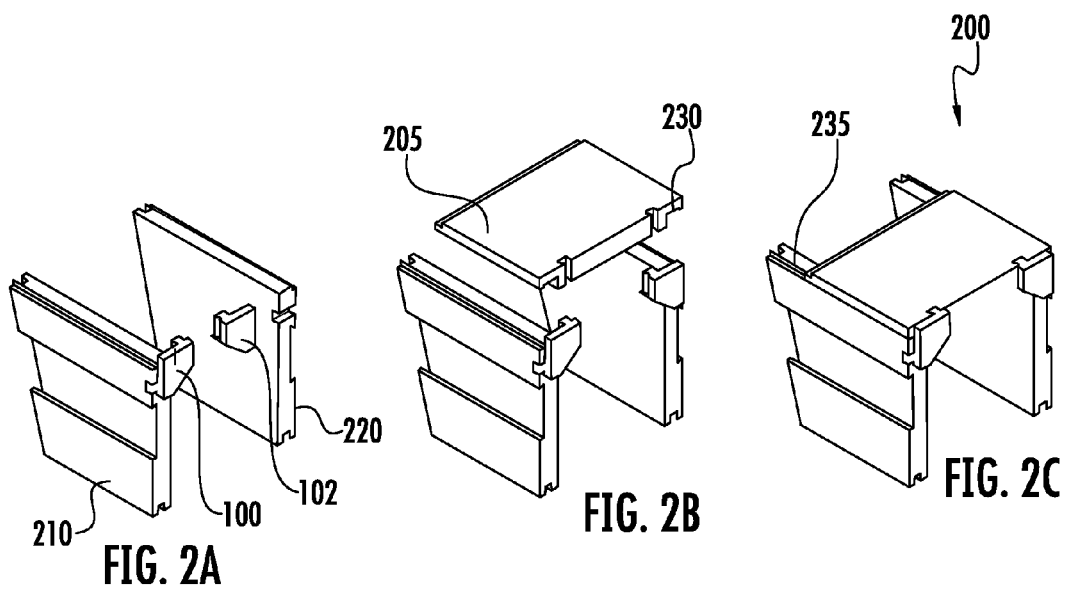
FIG. 2A
FIG. 2B
FIG. 2C

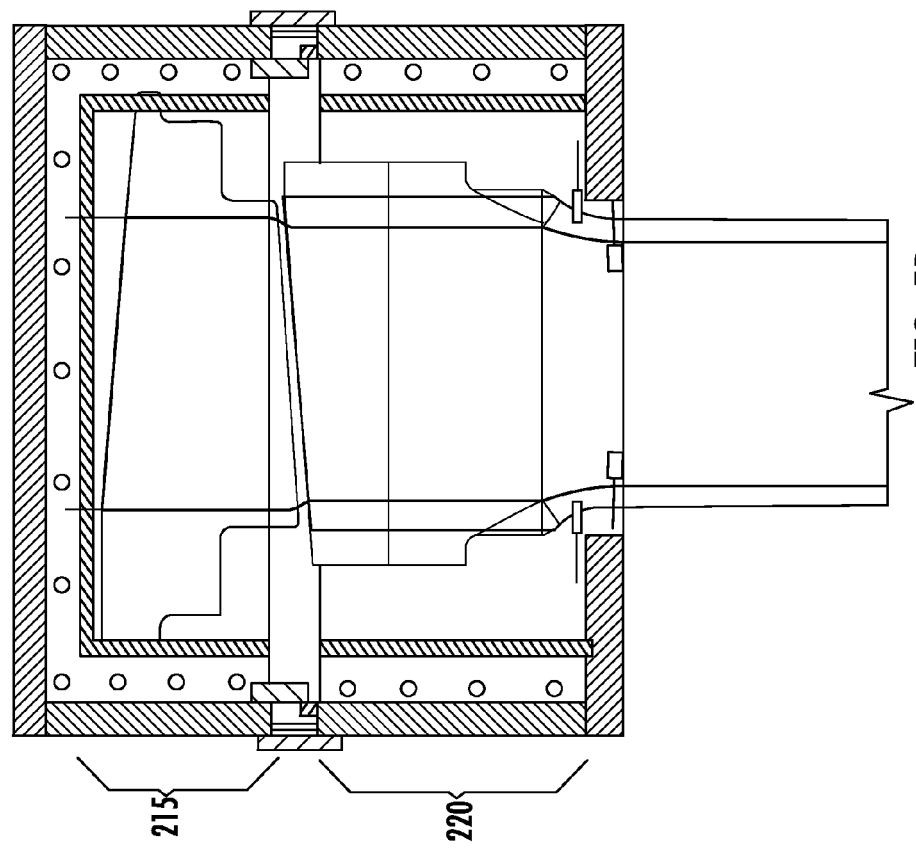
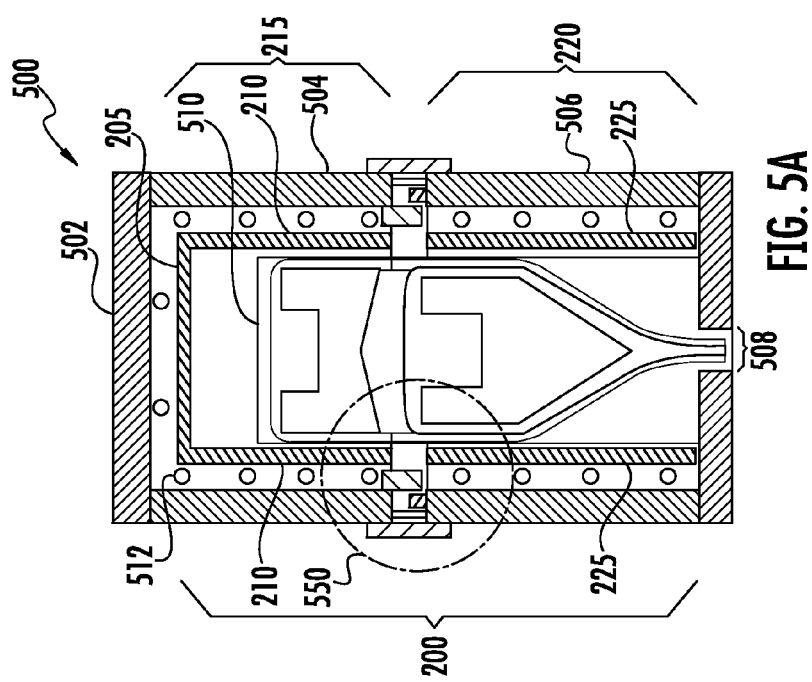

REFRACTORY LINER STRUCTURE AND USE IN GLASS FUSION DRAW

CROSS-REFERENCE TO RELATED APPLICATIONS

This application claims the benefit of priority under 35 U.S.C. §119 of U.S. Provisional Application Ser. No. 61/676,028, filed Jul. 26, 2012, the content of which is relied upon and incorporated herein by reference in its entirety.

This application is related to commonly owned and assigned U.S. Pat. No. 8,007,913, issued Aug. 30, 2011, to Coppola, et al., entitled "Laminated Glass Articles and Methods of Making Thereof"; to copending patent application U.S. Ser. No. 13/479,701, filed May 24, 2012, to Coppola, et al., entitled "Apparatus and Method for Control of Glass Streams in Laminate Fusion," and to copending patent application U.S. Ser. No. 61/678,218, filed Aug. 1, 2012, entitled "Method and Apparatus for Laminate Fusion," which content is relied upon and incorporated herein by reference in its entirety, but does not claim priority thereto.

The entire disclosure of any publication or patent document mentioned herein is incorporated by reference.

BACKGROUND

The disclosure generally relates to an apparatus for use in fusion draw glass manufacture.

SUMMARY

The disclosure provides an apparatus for use in fusion draw glass manufacture. More particularly, the disclosure provides a refractory liner structure ("liner") for controlling thermal properties of the draw glass streams and for protecting the draw glass streams from ambient internal environmental contamination. In embodiments, the liner is situated between an outer muffle housing ("muffle") and an internal chamber including the fusion draw isopipe(s).

BRIEF DESCRIPTION OF DRAWINGS

In embodiments of the disclosure:

FIG. 1 shows an exemplary corner brace (100) component of the disclosed liner structure.

FIGS. 2A to 2C show an exemplary sequence or order of assembly of the disclosed structure.

FIGS. 5A to 5B, respectively, show an exemplary schematic of the end view cross-section of a fusion draw and cross section in side view of the fusion draw apparatus (500) and the disclosed liner (200) shown in FIG. 5A.

DETAILED DESCRIPTION

Figure 3A:
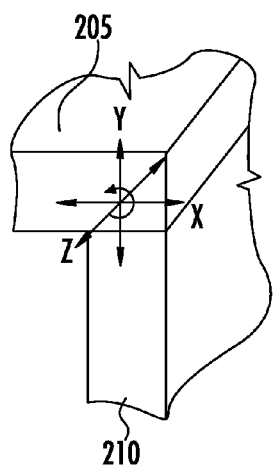
FIGS. 3A to 3C show the progression of constraining the degrees of freedom of a side (210) and the top panel (205) of the liner structure (200) by implementation of aspects of the corner braces (100, 102).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Dovetail joint" refers to a mechanical bond between a brace and a top panel and a wall (e.g., slip-fit). A "dovetail joint" includes at least one tenon on one structural member for receiving at least one mortise on another structural member. The combination of the tenon and mortise produces the joint.

"Adhesive joint" refers to a material bond between a top panel and a wall member (e.g., sealed by the adhesive).

"Tongue-and-groove" joint refers to a joint made by a tongue on one edge of a panel or a wall member fitting into a corresponding groove on the edge of another edge of a panel or a wall member.

A "gusset" is a plate or bracket for strengthening an angle in framework. In embodiments, the brace component of the disclosed refractory liner can be viewed as a modified gusset in structure and function.

"Include," "includes," or like terms mean encompassing but not limited to, that is, inclusive and not exclusive.

"About" modifying, for example, the quantity of an ingredient in a composition, materials, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for construction or preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to thermal aging of a structure, a composition, or a formulation with a particular initial concentration or mixture, and amounts that differ due to mixing or processing a composition or formulation with a particular initial concentration or mixture. The claims appended hereto include equivalents of these "about" quantities.

"Optional" or "optionally" means that the subsequently described event or circumstance can or cannot occur, and that the description includes instances where the event or circumstance occurs and instances where it does not.

"Consisting essentially of" in embodiments can refer to, for example:

a refractory liner article;

a fusion draw glass making apparatus having a muffle section including the disclosed refractory liner article;

a method of making the refractory liner; and a method of making glass using the fusion draw glass making apparatus having a muffle section including the disclosed refractory liner article, as defined herein.

The apparatus having the refractory liner for making glass, the method of making the glass, the resulting glass article, the compositions, or the formulations, of the disclosure can include the components or steps listed in the claim, plus other components or steps that do not materially affect the basic and novel properties of the compositions, articles, apparatus, or methods of making and use of the disclosure, such as particular glass compositions, particular additives or ingredients, a particular agent, a particular structural material or component, a particular melt or draw condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The apparatus, and methods of the disclosure can include any value or any combination of the values, specific values, more specific values, and preferred values described herein, including explicit or implicit intermediate values and ranges.

In embodiments, the disclosure relates to the manufacture of glass sheet in a fusion draw machine (FDM). More particularly the disclosure expands on the known method and apparatus for creating laminate sheet glass (see U.S. Pat. No. 4,214,886).

In embodiments, the disclosed apparatus, and the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

In low temperature applications, such as below 1,000° F., stability and rigidity can be obtained using conventional ductile mechanical fasteners. However, materials capable of sustaining extremely high temperature operation are typically brittle and therefore are not suitable for use as a conventional fastener. The disclosed refractory liner permits maximum material loading in shear and bearing in its joints. Additionally, the component parts of the disclosed liner when assembled, are locked together by a combination of gravity and by component geometry.

A refractory material retains its strength at high temperatures. ASTM C71 defines refractories as "non-metallic materials having those chemical and physical properties that make them applicable for structures, or as components of systems, that are exposed to environments above 1,000° F. (811 K; 538° C.)". For example, the oxides of aluminum (alumina), silicon (silica), magnesium (magnesia), and like materials, such as carbides, or combinations thereof, can be used as materials of construction for the liner. Any of the components of the interlocking structure can be made of a suitable refractory material, for example, a material that withstands the high temperature environment within the fusion draw apparatus during operation. Most extreme high temperature materials are brittle, e.g., silicon carbide (e.g., carborundum or moissanite). The application of these materials for structural bracing is tailored to their special material properties. The disclosed interlocking structure minimizes tensile loads in the brace and distributes the remaining shear loads over a larger liner surface area.

In embodiments, the liner is situated between (the enclosure formed by) a muffle housing and a chamber occupied by a first upper isopipe and a lower isopipe in the fusion draw apparatus. In embodiments, the liner can further comprise external structural bracing between the liner and the muffle housing. In embodiments, additional external structural bracing can be used to supplement the stability gained by the structural brace and optional adhesive bond between the top panel and the first and second walls. This can take the form of, for example, sillimanite blocks embedded in the refractory brick surrounding the liner. Sillimanite is an alumino-silicate mineral of the formula $Al_2SiO_5$.

In embodiments, the control of the fusion process generally, or the laminate fusion process in particular, calls for the disclosed liner structure to be spatially oriented or moved in one or more prescribed motions, independently or dependently when linked to the muffle. To accommodate the orientation and movement aspects of the muffle, the liner, or both, the liner structure is preferably rigid and stable enough to undergo coordinated angular perturbations or movements within the muffle or as part of the muffle.

In embodiments, the disclosure provides a refractory liner, comprising: an interlocking structure comprising:
  a top panel;
  a first wall and second wall;
  a first brace having a first interlock and a second interlock, the first interlock is situated on a first axis and the second interlock is situated on a second axis orthogonal to the first axis, the first interlock interlocks with a first complementary interlock on the first sidewall, and the second interlock interlocks with a first complementary interlock on the top panel; and
  a second brace having a first interlock and a second interlock, the first interlock is situated on a first axis and the second interlock is situated on an second axis orthogonal to the first axis, the first interlock interlocks with a first complementary interlock on the second sidewall, and the second interlock interlocks with a second complementary interlock on the top panel.

In embodiments, the first interlock, the second interlock, the first complementary interlock, and the second complementary interlock can be independently selected from a mortise, a tenon, or equivalent structures, or a combination thereof, or like interlock connections or like interlock connectors.

In embodiments, the disclosure provides a refractory liner article, the liner is also known as the "dog house," for use in a fusion draw apparatus, comprising:
  an interlocking structure comprising:
  a top panel, i.e., a cover tile;
  a first wall and second wall, i.e., the side walls;
  a first brace having a first tenon and a second tenon, the first tenon is situated on a first axis, e.g., an x-axis that is perpendicular to plane of the first wall, and the second tenon is situated on a second axis, e.g., a y-axis that is perpendicular to plane of the top panel, orthogonal to the first axis, the first tenon interlocks with a first mortise on the first sidewall, and the second tenon interlocks with a first mortise on the top panel; and
  a second brace having a first tenon and a second tenon, the first tenon is situated on a first axis and the second tenon is situated on an second axis orthogonal to the first axis, the first tenon interlocks with a first mortise on the second sidewall, and the second tenon interlocks with a second mortise on the top panel.

The refractory liner can further comprise an optional adhesive seal applied between the top panel and each of the first wall and the second wall, wherein the adhesive seal fixes the lift-and-lower sliding motion of the top panel along the y-axis (i.e., is fixed, constrained, or the degree of freedom is eliminated).

The refractory liner can further comprise a second refractory liner portion, where the first refractory liner forms a top half, the second refractory liner forms a bottom half, and which halves are oriented to form a chamber to accommodate at least one fusion draw isopipe. In use the combined refractory liner is oriented substantially upright having one refractory liner as the top and another similar refractory liner as the bottom situated beneath the top refractory liner. The bottom refractory liner differs from the top refractory liner by, for example, the top liner has a top cover that is substantially "closed" or without significant holes or gaps, whereas the bottom liner has a bottom panel that has is substantially "open", for example, having a gap in the bottom panel that allows for laminate or like glass sheets, formed in the chamber, to pass out of the chamber and progress toward additional optional processing, such as cooling, stretching, cutting, and like post-draw or post-lamination unit operations.

The interlocking structure of the component pieces of the refractory liner can be comprised of slip-fitted components. The slip fit between components, that is the engagement of the respective tenon pairs on the braces and mortise pairs on the top panel and walls (i.e., the tenons on each brace and the mortises on each of the side walls) result in perpendicular dovetail joints that restricts axial, lateral, and rotational degrees of freedom of the interlocking structure and the liner article.

The interlocking structure can have, for example, at least two restricted or fixed (that is, is fixed, constrained, or eliminated) degrees of freedom comprising, for example: the side-to-side sliding motion along the x-axis, and the rotation about the z-axis.

The interlocking structure components can be made, for example, of any suitable refractory material.

The interlocking structure can have an upper portion and a lower portion, or halves, which halves can be separated by a gap. The gap provides for orientational control of a muffle having two halves. The interlocking structure can have open or partially open ends to permit the egress of the molten glass source(s), and can have an open bottom to permit the egress of the resulting fusion glass product.

The interlocking structure can have, for example, a height to width aspect ratio (see FIG. 5A, the relative vertical to horizontal dimensions) of, for example, from 10:1 to 1:10, 7:1 to 1:7, 5:1 to 1:5, 2:1 to 1:2, including intermediate values and ranges.

In embodiments, the liner can be taller with respect to the width of the base or the width of the top panel, i.e., a higher aspect ratio. The higher aspect ratio of the structure combined with the optional adjustable motion or movements of the muffle fusion draw apparatus calls for the liner structure to have considerable structural integrity. Accordingly, the disclosed interlocking structure provides superior mechanical strength and rigidity to the refractory liner. The interlocking structure can also have, for example, a height to length aspect ratio (see FIG. 5B the relative vertical to horizontal dimensions) of, for example, from 1:10, 1:7, 1:5, 1:2, 1:1, and like ratios, including intermediate values and ranges.

In embodiments, if the liner has a long length dimension then more than one top panel, such as from 2 to 10 or more, may be called for to form a completely or substantially closed top to the liner. Similarly, if the liner has a long length dimension then more than one side panel, such as from 2 to 10 or more, on each side wall may be called for to form continuous side walls of the liner. Multiple top panels or multiple side wall panels can be integrated into the liner structure and joined together with, for example, interlocking joints, such as using the end notches shown in FIG. 2.

The disclosed refractory liner is stable to tilt motion, roll motion, slide motion, or combinations thereof, and like translational motions, rotational motions, or combinations of translational motions and rotational motions. The high motion stability of the refractory liner applies to the free standing liner structure or the liner structure when fastened to the interior of the muffle.

The refractory liner can be free of separate mechanical fasteners in constructing the free standing liner structure. In embodiments, the optional adhesive can provide a bond between mating parts including the cover tile relative to the sidewalls of the liner to provide additional structural rigidity that can prevent minor slippage of the cover panel or cover tile relative to the sidewalls. Additionally, the optional adhesive can provide a seal between the walls of the structure to prevent infiltration of foreign material that can increase the lubricity or slippage of the joint interface and potentially compromise the structural integrity of the liner.

The refractory liner structure can further comprise a surface boss on the side edges of the top panel that interlocks with a via situated on one top edge of each of the first and second walls to form, for example, a tongue-and-grove joint.

The refractory liner can further comprise an adhesive applied between the surface bosses of the top panel and each of the vias on the first wall and the second wall to form a seal between the top panel and contact point(s) or contact regions of the walls to fix the top panel's lift and lower degree of freedom along the y-axis.

In embodiments, the liner has a structural corner brace component having perpendicular dove tail joints. In embodiments, the walls can have an optional surface boss that can further fix the structural components in three dimensional space and to resist any forces acting on the joint. In embodiments, a contoured "puzzle piece" shape of the dovetail joint is preferred and draws the joints together, effectively making them tighter, if an external or destabilizing force is applied.

The refractory liner can further comprise a second refractory liner in combination with the refractory liner, wherein the combined liners, in an upper and lower relation, form a chamber for fusion draw processing, and the combined liners provide a thermal barrier that prevents heat loss, and a protective barrier that protects the glass stream(s) in the fusion draw from external contamination, such as from the heater elements that maintain the glass in a liquid state within the fusion draw area.

Referring to the Figures, FIG. 1 shows an exemplary corner brace (100) component of the disclosed liner structure having two perpendicular tenons (110, 120) that respectively engage the complementary mortises of a top panel or cover tile, and one of two side walls of the structure, respectively, to form dovetail joints. These dovetail joints can restrict axial, lateral, and rotational degrees of freedom of the liner to impart superior structural stability. In embodiments, the brace can preferably have symmetrical tenons mortises (110, 120) such that the first brace can be interchanged with the second brace. Stated alternatively, an exemplary corner brace (100) design having mirror image symmetry can be used for each of the called for corner braces in the disclosed structure.

In embodiments, the tenons of the corner brace can instead be mortises, and the mortises of the top panel the side walls can instead be tenons. In embodiments, the tenons of the corner brace can instead have a combination of a tenon and a mortise, and the mortises of the top panel and the side walls can instead have suitable complementary combinations of tenons and mortises. The corner brace (100) can form two perpendicular dovetail joints by respectively engaging the side wall and top panel or cover tile of the structure. These joints can restrict axial, lateral, and rotational degrees of freedom. Once the structure is assembled these degrees of freedom are constrained and stabilize the liner structure.

FIGS. 2A to 2C show an exemplary sequence or order of assembly of the disclosed structure. FIG. 2A shows the first step of the assembly where a tenon (e.g., 110 or 120) of a first brace (100) is slideably engaged with the mortise of a first wall (210). Then the tenon (e.g., side (110) or vertical (120)) of a second brace (102) is slideably engaged with the mortise of a second wall (220). FIG. 2B shows the second step of the assembly where the mortises of a top panel (205) are, for example, downwardly slideably engaged with the remaining available top or vertical mortises of the first and second braces (100, 102). FIG. 2C shows the third step of the assembly where the slideably engaged top panel (205) and first and second walls can have an optional boss (235) and via (230 in FIG. 2B) combination that can be further engaged and joined with, for example, an optional adhesive, a weld, or like fastener, to complete the assembly of the liner structure (200). The liner structure (200) is preferably assembled as illustrated and in the specified sequence so that all components engage properly and securely. In embodiments, a plurality or multiplicity of sequentially aligned panel and wall components are contemplated and can be readily assembled in forming the disclosed structure.

In embodiment, the order of assembly of the liner can be significant for superior structural integrity. The structure can be assembled in the prescribed sequence for all components to correctly engage. The only degree of freedom remaining in the assembled structure is the vertical motion of the top cover. During normal operation and positioning in the muffle housing, the top cover cannot move vertically. However, once an optional adhesive is applied to the cover tile-wall joints, the vertical degree of freedom is also constrained.

Figure 3B:
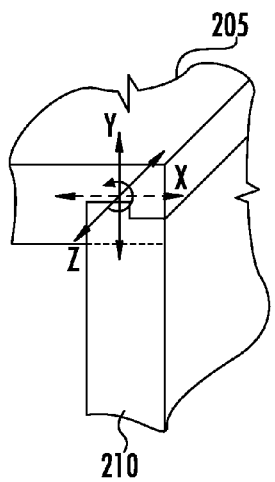
Figure 3C:
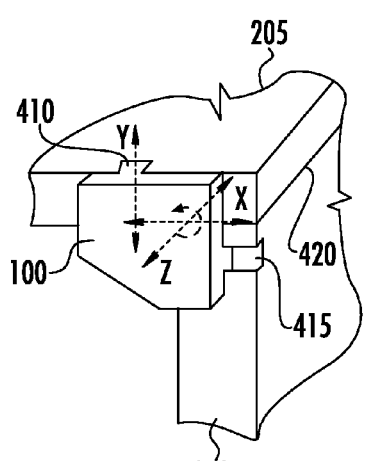

FIGS. 3A to 3C shows schematically the progression of constraining the degrees of freedom of a side wall (210) and the top panel (205) of the liner structure (200) by implementation of aspects of the corner braces (100, 102). FIG. 3A shows an unjointed and unconstrained structure having translational degrees of freedom in each of the x-, y-, and z-axes, and rotational degrees of freedom at least about the z-axis. FIG. 3B shows a boss of side wall (210) and via in the top panel (205) jointed and constrained structure, but without an optional adhesive, between wall (210) and top panel (205) having translational degrees of freedom in only the y- and z-axes. The rotational degree of freedom about the z-axis remains. FIG. 3C shows corner brace added to the boss and via jointed (i.e., the tongue-in-groove (420) joint) and constrained structure between wall (210) and top panel (205) of FIG. 3B. The translational degrees of freedom in the x- and z-axes, and the rotation about the z-axis are lost and are now fixed by the interaction of the brace's tenons with the mortises (410, 415) of top and side wall. Only the translational degree of freedom along the y-axis remains. Addition of an optional adhesive, or like fixative, to the tongue-in-groove (420) fixes the remaining translational degree of freedom along the y-axis.

In embodiments, the disclosure provides a structural assembly that can provide a stabilized refractory liner (aka: doghouse) structure by limiting the unconstrained degrees of freedom at the corner joints of the assembly. The disclosed corner joints and additional bracing constrain the degrees of freedom and strengthen the structure.

Figure 4:
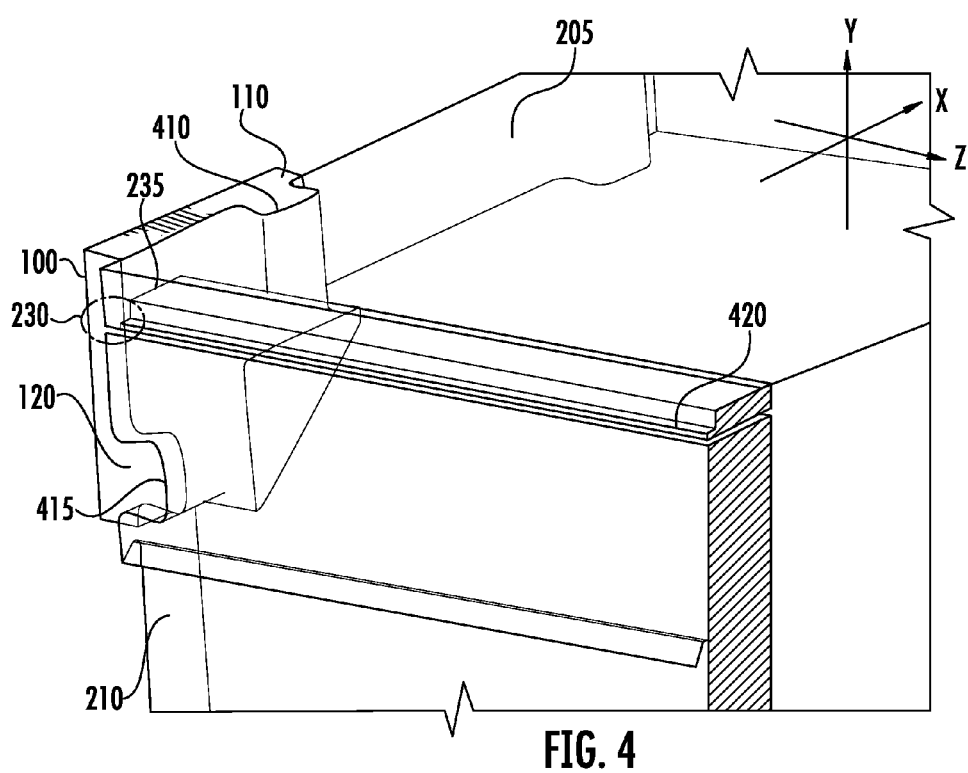
FIG. 4 shows a side perspective view of the assembled liner structure of FIG. 2C and further demonstrates the superior mechanical stability.

FIG. 4 shows a side perspective view of the assembled liner structure of FIG. 2C and further demonstrates the superior mechanical stability. The tenons (110, 120) of the brace (100) engage the mortises (410, 415) of the top panel (205) and the side wall (210) and result in interlocking dovetail joints. The engagement of the boss (230) of the top panel and the via (235) of the side wall result in tongue-in-groove joint (420).

The tongue-in-groove joint eliminates the side-to-side degree of freedom. An applied adhesive provides further stability and durability to the tongue-in-groove joint (420) and liner structure, and prevents thermal loss from and prevents infiltration of foreign material into the fusion draw process. Alternatives to the tongue-in-groove joint can include, for example, a rabbet joint, butt joint, or like joint designs, but these may provide less stability than the tongue-in-groove joint and adhesive combination.

The corner brace and optional adhesive joint combination constrain the longitudinal and rotational degrees of freedom. Additionally, the weight of the top cover, the optional adhesive bonding, and the range of motion of the muffle apparatus constrain the remaining degrees of freedom. This creates a rigid, stable doghouse structure.

FIG. 5A show an exemplary schematic of the end view cross-section of a fusion draw apparatus (500) having a muffle structure (502) housing a double or laminate fusion draw configuration (510) and the disclosed liner (200). The apparatus (500) includes a muffle structure (502) having a first upper portion (504) having a top and at least two long sides and a second lower portion (506) having a bottom and at least two long sides. The bottom of the lower portion (506) includes an opening (508) for egress of the glass or laminate product. The muffle structure (502) defines and provides a chamber occupied by the fusion draw apparatus (510) having one or more isopipes (a first upper pipe and lower pipe shown). The muffle (502) provides a thermally insulated chamber that houses the isopipes. The muffle (502) can further include or encompass one or more heat source element (512), for example, a glow bar, microwave, or like heating elements. The muffle (502) further includes and encompasses the refractory liner (200) made of, for example, a radiant heat resistant material, such as silicon carbide, situated between the enclosure formed by the muffle (502) and the chamber for the fusion draw apparatus (510). The refractory liner (200) can include an upper portion (215) having the top panel (205) and side walls (210), and a lower portion (220) having the side walls (225) and an open bottom or partially closed bottom (not shown). The liner structure protects the liquid glass streams from possible contamination from the heat source element (512) and can moderate the heating uniformity within the chamber. The upper portions (504; 215) and the lower portions (506; 225) of the muffle (502) and the liner (200) can be separated or divided by a seal region (550). The seal region (550) is described in detail in the abovementioned copending patent application U.S. Ser. No. 61/678,218. The seal region can include, for example, one or more optional seals having a different or redundant function, for example: a radiative seal made of a radiant heat resistant material, such as fire brick that retains large amounts of radiated heat within the pipe chamber; a thermal seal made of a flexible fire resistant material, such as Safil fabric, that further reduces thermal losses; and a convective seal made of a flexible material, such as rubber or silicone rubber, that reduces convective losses and retains additional amounts of heat within the pipe chamber. The thermal seal can be, for example, attached to both the upper portion (504) and the lower portion (506) of the muffle. Alternatively, the thermal seal can be, for example, attached to only the upper portion (504) of the muffle and loosely draped onto the lower portion (506) of the muffle. The seal region (550) is a significant aspect of the superior result provided by the fusion apparatus having the disclosed liner. That region can: maintain requisite similar temperature profiles within the interior of the upper and lower portions of the muffle; and permits the upper and lower portions of the muffle to be independently spatially adjusted. Alternatively or additionally, the position of the upper clad pipe in space with respect to the lower core pipe can be independently spatially adjusted to change or control the thickness ratio of the clad to the core in the resulting laminate product. In embodiments, the upper and lower portions of the muffle can be independently adjusted in space to permit the gap region between the upper and lower isopipes to be adjusted to change the thickness ratio of the clad glass to the core glass in the drawn laminate product. In embodiments, the upper clad pipe or the upper liner portion (215) can be fixed within the upper portion (504) of the muffle, and the lower core pipe or the lower liner portion (220) can be fixed within the lower portion (506) of the muffle, so that a spatial adjustment of the upper portion of the muffle results in an accompanying spatial adjustment of the upper clad pipe. Each seal permits the independent adjustment of the spatial orientation of the upper and the lower portions of the muffle and consequently the relative orientation of the liner portions and the isopipes, and ultimately controls the relative thickness and uniformity of the clad and core streams produced by the disclosed glass fusion apparatus.

FIG. 5B shows a schematic cross section in side view of the fusion draw apparatus (500) and the disclosed liner (200) shown in FIG. 5A.

In embodiments, the disclosure provides an apparatus for forming laminated sheet glass, comprising:

a lower pipe that provides a first glass stream of the core of the laminate; and a first upper pipe that provides a second glass stream onto the first glass stream that forms the first outer clad layer on the inner core of the laminate;

a muffle comprising:

a first upper portion having a top and at least two long sides; and a second lower portion having a bottom having an opening and at least two long sides, the first and second muffle portions define a chamber occupied by the first upper pipe and lower pipe respectively (that is, the muffle provides a thermally insulated chamber that houses the isopipes);

a refractory liner situated between the enclosure formed by the muffle and the chamber occupied by the first upper pipe and lower pipe;

at least one gap seal, that is the gap seal(s), situated near the gap between the bottom of the first upper portion and the top of the second lower portion of the muffle;

at least one heat source, that is a heater element, for example, a glow bar, glo-bar microwave heater, solar concentrating heater, or like heating element, within at least one of, and preferably each of or both, the first upper portion and the second lower portion of the muffle; and an adjustment system, that is an adjustable support and movement system, operably adapted to change the relative position of the upper portion of the muffle with respect to the lower portion of the muffle and a first gap and a second gap between the first upper pipe and the lower pipe.

The top of the lower pipe and the bottom of the first upper pipe can be separated from each other by a first gap on one long side and a second gap on the other long side. The position of the lower pipe and the position of the first upper pipe are each independently adjustable to control the dimensions of the first gap, the second gap, or both.

In embodiments, the adjustment system can independently support each of the upper and lower muffle portions from above, below, a side, an edge, a corner, or a combination thereof. The adjustment system comprises at least one of independently adjustable: suspenders (e.g., attached from above); a lift, a jack, an hydraulic ram (e.g., attached from below); a robot (e.g., an industrial robot attached, for example, from above, below, a side, an edge, a corner, etc., and combinations thereof). An industrial robot can be, for example, an automatically controlled, reprogrammable, multipurpose manipulator programmable, such as in three or more axes, or a combination thereof.

The at least one seal can be, for example:

a first seal situated between the first upper portion and the second lower portion of the muffle, and in proximity to the first gap and the second gap of the pipes (the first seal minimizes heat loss and maintains heating consistency or uniformity within the chamber and in the area of the gaps between the isopipes or portions of the muffle; for example, made of a refractory material, such as one or more bricks);

a second seal situated in proximity (e.g., between) the first upper portion and the second lower portion of the muffle, and in proximity to the first seal and distal to the first gap and the second gap of the pipes (the second seal minimizes thermal loss escaping through the first seal member, and the second seal can be made of, for example, a flexible refractory material, such as Safil® alumina fibers);

a third seal situated in proximity to the first upper portion and the second lower portion of the muffle, and in proximity to the second seal member and distal to the first gap and the second gap of the pipes (the third seal can be, for example, a flexible or pliable heat resistant material, such as silicone or rubber, that minimizes or eliminates air flow losses escaping through the first or second seal members);

or a combination thereof.

The dimensions of the first gap and the second gap between the isopipes or portions of the muffle can be the same or different. If the dimensions of the first gap and the second gap are the same, the resulting laminated sheet glass has a clad layer on each side of the core having substantially the same thickness, and if the dimensions of the first gap and the second gap are different, the resulting laminated sheet glass has a clad layer on each side of the core having a different thickness. The separation dimension of the gaps between the bottom of the upper pipe and the lower pipe can be, for example, substantially equidistant across the entire span of the gap, or the separation dimension of the gaps between the bottom of the upper pipe and the lower pipe is non-equidistant across the entire span of the gap, or a combination thereof.

In embodiments, the liner can be fixedly attached to the muffle or like structure. Accordingly, the liner can have, for example, zero to one degree of freedom (DOF) or more. The position of the muffle body in space can be defined by three components of translation and three components of rotation, and can have six degrees of freedom if not physically constrained. The six degrees of freedom include, translational and rotational motion in three dimensional space. The three translational degrees of freedom include: moving up and down (i.e., heaving); moving left and right (i.e., swaying); and moving forward and backward (i.e., surging). The three rotational degrees of freedom include: tilting forward and backward (i.e., pitching); turning left and right (i.e., yawing); and tilting side to side (i.e., rolling).

In embodiments, the lower pipe or lower liner portion can be fixed in space and the first upper pipe or upper liner portion can be adjusted in at least one of its six degrees of freedom (DOF). Conversely, the first upper pipe or upper liner portion can be fixed in space and the lower pipe or lower liner portion can be adjusted in at least one of its six degrees of freedom (DOF).

In embodiments, the disclosure provides an apparatus for forming laminated sheet glass, comprising:

a lower pipe that provides a first glass stream that forms the core of the laminate; and a first upper pipe that provides a second glass stream onto the first glass stream that forms the first outer clad layer on the inner core of the laminate;

the top of the lower pipe and the bottom of the first upper pipe being separated from each other by a first gap on one long side and second gap on the other long side, and the position of the at least one of the lower pipe, the first upper pipe, or both, can be independently adjustable to control the dimensions of the first gap, the second gap, or both.

The apparatus can further comprise an independent support system associated with each of the lower pipe and the first upper pipe, wherein the position of at least one of the lower pipe, the first upper pipe, or both, is independently adjustable, directly or indirectly, by changing the position of the independent support system associated with at least one of the lower pipe, the first upper pipe, or both. The independent support system can be, for example, at least one of a suspension member that supports from above, below, a side, an edge, a corner, or combinations thereof. The suspension member can include, for example, a track and trolley system that can provide, for example, physical support, and convenient motion adjustment including, for example, translation motion, rotation motion, or combinations thereof. In embodiments, the position of at least one of the lower pipe, the first upper pipe, or both, of the disclosed apparatus can be remotely adjusted (e.g., an industrial robot system attached to either or both the first portion or second portion of the muffle). Remote adjustment capability can provide advantages, such as improved operator safety and improved equipment longevity, by avoiding high temperature conditions in or near the muffle. Alternative support and motion structures can include, for example, a gimbal architecture having 3- or 4-axes in a nested configuration, an articulated robot having, for example, two independent arms, and from 1 to 6 degrees of freedom (DOF) in a kinematic chain, and like structures. In embodiments, the support system associated with one or both of the lower pipe and the first upper pipe can independently adjust: vertically to control the separation dimension of the gaps between the bottom of the upper pipe and the top of the lower pipe; angularly to control the landing angle ($\Phi$) of the second liquid glass stream onto the first liquid glass stream; horizontally to control the off-set dimension of the gaps between the bottom of the upper pipe and the top of the lower pipe, or combinations thereof.

In embodiments, the disclosure provides a method for forming laminated sheet glass in the disclosed apparatus having the disclosed refractory liner article, comprising:

adjusting at least one of the first and second gap dimensions between the upper and lower pipes to pre-determine the thickness ratio of the clad and core of the resulting laminate;

flowing a first glass stream over the lower pipe to form the core of the laminate; and simultaneously flowing a second glass stream over the upper pipe and then onto to the first glass stream to form the clad of the laminate on the core of the laminate.

The method can further comprise adjusting the upper portion of the muffle, the lower portion of the muffle, or both, to change the gap separation, the landing angle ($\Phi$), or combinations thereof, of the second glass stream onto to the first glass stream.

The first gap and second gap can be adjusted prior to use, in use, or after use, to provide glass thickness ratios of the core layer to clad layer laminate from 10:1 to 1:10, for example, 10:1 8:1, 6:1, 4:1, 3:1, 2:1, 1:1, 1:2, 1:3, 1:4, 1:6, 1:8, and 1:10, including intermediate values and ranges. Larger or smaller core layer to clad layer glass ratios may be possible, such as 50:1, 40:1, 30:1, 20:1, 15:1, 12:1, 1:12, 1:15, 1:20, 1:30, 1:40, and 1:50, including intermediate values and ranges, but may require reconfiguration of the apparatus, such as selecting isopipes or glass stream feed pipes having different relative dimensions.) The thickness of the core layer can be, for example, from 50 micrometers to 1,000 microns, and the thickness of the clad layer can be, for example, from 1,000 micrometers to 50 microns.

In embodiments, the apparatus including the refractory liner and the method of use can further comprise having a plurality of upper pipes stacked above the upper pipe to provide a laminate sheet glass where the number of layers corresponds to twice the number of total upper pipes.

The disclosure has been described with reference to various specific embodiments and techniques. However, it should be understood that many variations and modifications are possible while remaining within the scope of the disclosure.

What is claimed is:

1. A refractory liner article for use in a fusion draw apparatus, comprising: an interlocking structure comprising:
    a top panel;
    a first wall and second wall;
    a first brace having a first tenon and a second tenon, the first tenon is situated on a first axis and the second tenon is situated on a second axis orthogonal to the first axis, the first tenon interlocks with a first mortise on the first sidewall, and the second tenon interlocks with a first mortise on the top panel; and
    a second brace having a first tenon and a second tenon, the first tenon is situated on a first axis and the second tenon is situated on an second axis orthogonal to the first axis, the first tenon interlocks with a first mortise on the second sidewall, and the second tenon interlocks with a second mortise on the top panel.

2. The refractory liner of claim 1 further comprising an adhesive seal applied between the top panel and each of the first wall and the second wall, wherein the adhesive seal fixes the lift-and-lower sliding motion of the top panel along the y-axis.

3. The refractory liner of claim 1 further comprising a second refractory liner, wherein the refractory liner forms a top half and the second refractory liner forms a bottom half and which halves are oriented to form a chamber to accommodate at least one fusion draw isopipe.

4. The refractory liner of claim 1 wherein interlocking structure is comprised of the slip-fitted components.

5. The refractory liner of claim 1 wherein interlocking structure has at least two restricted or fixed degrees of freedom comprising: the side-to-side sliding motion along the x-axis.

6. The refractory liner of claim 1 wherein the interlocking structure is made of a refractory material.

7. The refractory liner of claim 1 wherein the interlocking structure has an upper and lower portion separated by a gap, has open ends, and has an open bottom.

8. The refractory liner of claim 1 wherein the interlocking structure has height to width aspect ratio of from 10:1 to 1:10.

9. The refractory liner of claim 1 wherein the liner is stable to tilt motion, roll motion, slide motion, or combinations thereof, and like translational motions, rotational motions, or combinations of both motions.

10. The refractory liner of claim 1 wherein the liner is free of separate mechanical fasteners.

11. The refractory liner of claim 1 further comprising a surface boss on the side edges of the top panel that interlocks with a via situated on one edge of each of the first and second walls to form a tongue-and-grove joint.

12. The refractory liner of claim 11 farther comprising an adhesive applied between the surface bosses of the top panel and each of the vias on the first wall and the second wall to form a seal between the top panel and contact point(s) or contact regions of the walls to fix the top panel's fill and lower degree of freedom along the y-axis.

13. The refractory liner of claim 1 further comprising a second refractory liner in combination with the refractory liner, wherein the combined liners form a chamber for fusion draw processing, and the combined liners provide a thermal barrier that prevents heat loss, and provide a protective barrier that protects the glass stream(s) in the fusion draw from external contamination.

14. A refractory liner, comprising:
an interlocking structure comprising:
   a top panel;
   a first wall and second wall;
   a first brace having a first interlock and a second interlock, the first interlock is situated on a first axis and the second interlock is situated on a second axis orthogonal to the first axis, the first interlock interlocks with a first complementary interlock on the first sidewall, and the second interlock interlocks with a first complementary interlock on the top panel; and a second brace having a first interlock and a second interlock, the first interlock is situated on a first axis and the second interlock is situated on an second axis orthogonal to the first axis, the first interlock interlocks with a first complementary interlock on the second sidewall, and the second interlock interlocks with a second complementary interlock on the top panel.

15. The refractory liner of claim 14 wherein any of the first interlock, the second interlock, the first complementary interlock, and the second complementary interlock are independently selected from a mortise, a tenon, or a combination thereof.

* * * * *